US006594762B1

(12) United States Patent
Doub et al.

(10) Patent No.: US 6,594,762 B1
(45) Date of Patent: Jul. 15, 2003

(54) METHODS AND DEVICES ENABLING DISPLAYS OF ELECTRONIC DEVICES BASED ON SEPARATION THEREOF

(75) Inventors: Mike Doub, Chapel Hill, NC (US); Tuyen Banh, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/305,867

(22) Filed: May 5, 1999

(51) Int. Cl.$^7$ .......................... G06F 11/30; G06F 1/26; G06F 17/60; H04H 1/00; H04M 1/66; H04B 7/00; H04B 1/38; H04K 1/00

(52) U.S. Cl. ...................... 713/200; 713/201; 713/202; 713/300; 713/310; 713/320; 709/217; 709/229; 455/3.05; 455/411; 455/517; 455/524; 455/555; 455/556; 705/67; 235/385

(58) Field of Search ................................ 713/200, 201, 713/202, 300, 310, 340, 320; 709/229, 217; 455/3.05, 411, 517, 524, 555, 556; 705/67; 235/385

(56) References Cited

U.S. PATENT DOCUMENTS

| 5,521,652 A | | 5/1996 | Shalvi .......................... 348/819 |
| 5,821,854 A | | 10/1998 | Dorinski et al. ............. 340/539 |
| 5,953,425 A | * | 9/1999 | Selker .......................... 235/380 |
| 5,960,085 A | * | 9/1999 | de la Huerga ............... 235/380 |

(List continued on next page.)

FOREIGN PATENT DOCUMENTS

| DE | 40 15 482 C1 | 5/1990 | |
| EP | 0 496 344 A1 | 1/1991 | |
| EP | 0 447 386 A2 | 3/1991 | |
| EP | 0 802 476 A2 | 4/1997 | ........... G06F/3/033 |
| EP | 0 823 520 A2 | 7/1997 | |

OTHER PUBLICATIONS

Riverside Webster's II New College Dictionary, 1995, Houghton Mifflin Company, p. 75, 1026, and 1150.*
Scambray, VicinID 2.0 Tightens PC Security, InfoWorld, 21, 42, 39, Oct. 18, 1999.*
Phillips, Air ID Eliminates Passwords, PC Week, v15, n12, p98(1), Mar. 23, 1998.*
Keeping intruders out, Banking World, vol. 13, No. 2.*
"Proximity Activated Computer Console Lock," IBM Technical Disclosure Bulletin, vol. 35, No. 6, Nov., 1992, pp. 173–176.
International Search Report, PCT/US00/09006, Aug. 16, 2000.

*Primary Examiner*—Gail Hayes
*Assistant Examiner*—Jenise Jackson
(74) *Attorney, Agent, or Firm*—Myers Bigel Sibley & Sajovec

(57) ABSTRACT

An electronic device and a remote device cooperate to enable a display of an electronic device when a distance between the electronic device and the remote device is less than a transmit range and to disable the display when the distance is greater than the transmit range. Disabling the display of the electronic device may improve the security of data on display. Moreover, the disabling and enabling of the display may be carried out automatically, thereby possibly relieving the authorized user from logging out or powering-off the electronic device to secure the display. When the authorized user carries the remote device, the display may be enabled and disabled as the user moves relative to the electronic device. The display of the electronic device may be enabled when the electronic device and the remote device are located within a first distance and the display is disabled when the remote device is located a second distance from the remote device, wherein the second distance is greater than the first distance. For example, when the user carries the remote device, the display is enabled when the user is within a first distance from the electronic device. When the user carriers the remote device to a second greater distance from the electronic device, the display is enabled.

28 Claims, 3 Drawing Sheets

U.S. PATENT DOCUMENTS 6,002,427 A * 12/1999 Kipust ........................ 340/571
6,088,450 A * 7/2000 Davis et al. ................. 235/380
6,151,678 A * 11/2000 Davis ......................... 713/200
6,189,105 B1 * 2/2001 Lopes ......................... 713/200
6,282,656 B1 * 8/2001 Wang ......................... 713/182
6,367,020 B1 * 4/2002 Klein .......................... 345/862

* cited by examiner

METHODS AND DEVICES ENABLING DISPLAYS OF ELECTRONIC DEVICES BASED ON SEPARATION THEREOF

FIELD OF THE INVENTION

The present invention relates the field of displays in general and more particularly to security for displays.

BACKGROUND OF THE INVENTION

Sensitive data or applications are sometimes run on computers which may not be located in secure environments. For example, personnel data may be accessed in an employee's office or cubicle in which it may be difficult to prevent unauthorized persons from seeing sensitive data or using the application when the computer is unattended by the authorized user. Moreover, as mobile electronic devices, such as Personal Digital Assistants (PDAs) or laptop computers, become more widely used, sensitive data or applications may be run by authorized users outside their offices, thereby further complicating the problem of access or observation by unauthorized users.

Authorized users may log-off the application or power-down the computer to avoid unauthorized users from observing or accessing the sensitive data. Unfortunately, these measures may call for the user to remember to manually perform the steps involved which may result in the authorized users forgetting or neglecting to take the preventative measures. Moreover, in cases where the authorized user is frequently away from the computer or other electronic device, logging-out of the application or powering-down the computer may be inconvenient or time consuming. Consequently, there is a need to improve the security of systems which provide access to sensitive data or applications in situations where unauthorized users may be nearby.

SUMMARY OF THE INVENTION

In view of the above, it is an object of the present invention to provide improved display devices, methods and systems.

It is another object of the present invention to allow improvement in the security of electronic device displays.

It is a further object of the present invention to allow more convenience securing displays of electronic devices.

These and other objects of the present invention can be provided by enabling a display of an electronic device when the electronic device and a remote device, are located within a transmit range of each other and disabling the display when the electronic device and the remote device are not within the transmit range of each other. Disabling the display of the electronic device may improve the security of data on the display. When the authorized user carries the remote device, the display is enabled and disabled as the user moves relative to the electronic device. Consequently, the security of the display may be protected when the authorized user is away from the display.

In one aspect of the present invention, the display of the electronic device is enabled when the electronic device and the remote device are located within a first distance and the display is disabled when the remote device is located a second distance from the remote device, wherein the second distance is greater than the first distance. For example, when the user carries the remote device, the display is enabled when the user is within the first distance from the electronic device. When the user carriers the remote device to the second distance from the electronic device, the display is enabled. Carrying the remote device may provide for the enabling and disabling of the display automatically, thereby possibly relieving the authorized user from logging out or powering-off the electronic device to secure the display.

In a further aspect of the present invention, the location of the electronic device and the remote device are determined with respect to a transmit range using signals transmitted between the remote device and the electronic device. In one embodiment, the electronic device transmits a transmit signal to the remote device which responds by transmitting a reply signal if the electronic device and the remote device are located within the transmit range of each other. If, however, the electronic device and the remote device are not located; within the transmit range of each other, the remote device does not transmit the reply signal.

In another aspect of the present invention, the reply signal includes a first authentication code, such as a pseudo-random code, that the electronic device may use to determine if the reply signal is authentic. For example, when the remote device determines that the electronic device and the remote device are located within the transmit rage of each other, the remote device transmits the reply signal, including the first authentication signal, to the electronic device so that the electronic device can verify that the reply signal originated with the remote device with which the electronic device cooperates.

In still another aspect of the present invention, the location of the electronic device and the remote device with respect to each other is determined using a signal threshold level. The signal threshold level corresponds to an expected signal strength of the transmit signal for the transmit range. The strength of the transmit signal received at the remote device is compared to the signal threshold level. If the strength of the transmit signal at the remote device is about equal to or more than the signal threshold level, the electronic device and the remote device can be assumed to be located within the transmit range of each other and the remote device transmits the reply signal. If, however, the strength of the transmit signal at the remote device is less than the signal threshold level, the electronic device and the remote device can be assumed to be located beyond the transmit range of each other and the remote device does not transmit the reply signal. In a preferred embodiment, the signal threshold level is adjustable to select the transmit range.

DETAILED DESCRIPTION OF THE INVENTION

The present invention now will be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects. The present invention is described herein by reference to an electronic device. It will be understood, however, that the electronic device described can be a Personal Data Assistant (PDA), hand-held personal computer, palm-top personal computer, lap-top personal computer, desk-top personal computer or other electronic device having a display.

Figure 1:
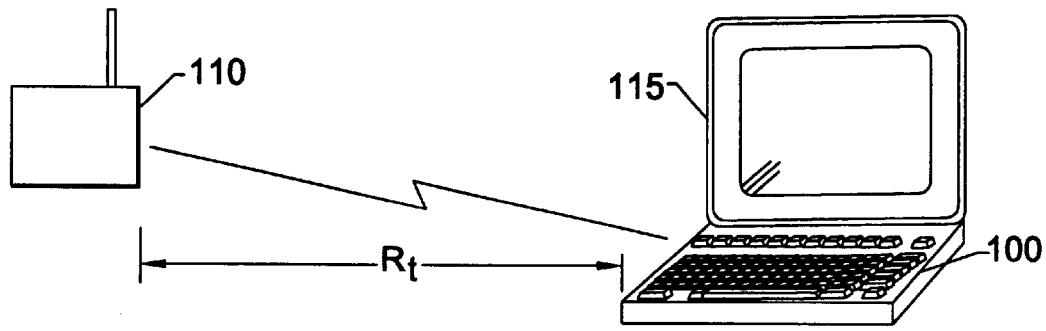
FIG. 1 is a diagram of an electronic device and a remote device that cooperate to control a display of the electronic device according to the present invention.

FIG. 1 is a diagram of an electronic device 100 and a remote device 110 that cooperate to control a display 115 of the electronic device 100 according to the present invention. The display 115 of the electronic device 100 is used to provide information to a user. The remote device 110 may be carried by the authorized user as the authorized user moves in relation to the electronic device 100. According to the present invention, the display 115 is enabled when the electronic device 100 and the remote device 110 are located within a transmit range, $R_t$, of each other. When the electronic device 100 and the remote device 110 are not located within the transmit range of each other, the display 115 is disabled. For example, if the transmit range is 4 feet, when the authorized user carries the remote device 110 more than 4 feet from the electronic device 100, the display 115 is disabled. When the authorized user carries the remote device 110 to within 4 feet of the electronic device 100, the display 115 is enabled so that the authorized user may view the information. Consequently, the information provided to the user may be protected from viewing by an unauthorized viewer while the authorized user is more than 4 feet away from the electronic device. In a preferred embodiment, the distance between the electronic device 100 and the remote device 110 is determined by signals transmitted between the electronic device 100 and the remote device 110.

Figure 2:
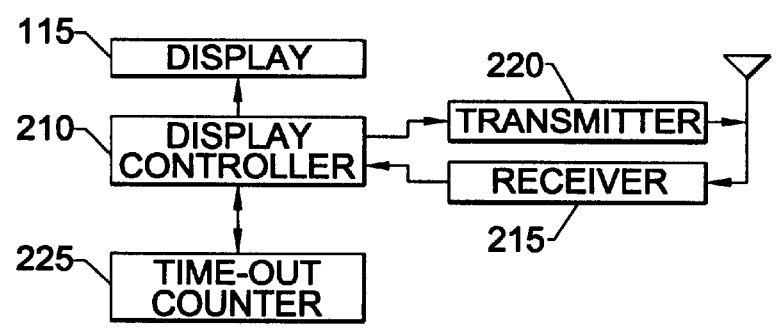
FIG. 2 is a block diagram of an embodiment of an electronic device of FIG. 1.

FIG. 2 is a block diagram of an embodiment of an electronic device 100 of FIG. 1. A transmitter 220 transmits a transmit signal to the remote device 110. The remote device 110 receives the transmit signal and determines if the electronic device 100 and the remote device 110 are located within the transmit range of each other. In other words, the remote device 110 uses the transmit signal to determine if the separation of the electronic device 100 and the remote device 110 exceeds the transmit range. If the separation does not exceed the transmit range, the remote device 110 transmits a reply signal to the electronic device 100 in response to the transmit signal. If, however, the separation exceeds the transmit range, the remote device 110 does not transmit the reply signal to the electronic device 100, thereby disabling the electronic device 100. In a preferred embodiment, the electronic device 100 transmits the transmit signal intermittently to reduce the amount of power used by the electronic device 100 and the remote device 110.

The reply signal from the remote device 110 is received at the electronic device 100 by a receiver 215. The received reply signal is provided to a display controller 210 that enables and disables the display 115 based on the reply signal. A time-out counter 220 counts the time elapsed since the transmit signal was transmitted to the remote device 110.

If the electronic device 100 does not receive an authentic reply signal within a time-out interval, the display controller 210 disables the display 115. For example, if the remote device 110 moves beyond the transmit range, the remote device 110 will not transmit the reply signal to the electronic device 100 in response to the transmit signal from the electronic device. Consequently, the time-out counter 225 will indicate a time-out condition to the display controller 210 if the time-out interval elapses before an authentic reply signal is received, thereby causing the display controller 210 to disable the display 115. When the remote device 115 returns to within the transmit range, the authentic reply signal is transmitted by the remote device 110 and received at the electronic device 100 before the time-out interval elapses. Consequently, the display controller 210 enables the display 115.

In a preferred embodiment of the present invention, the reply signal includes a first authentication code, such as a pseudo-random code, that the electronic device 100 uses to determine if the reply signal is authentic. For example, when the remote device 110 determines that the electronic device 100 and the remote device 110 are located within the transmit range of each other, the remote device 110 transmits the reply signal including the first authentication signal to the electronic device 100.

The display controller 210 determines that the first authentication code included in the reply signal identifies the remote device 110 with which the electronic device 100 cooperates to control the display 115. For example, during an initial set-up procedure, the user may input a password or other data into the electronic device 100 and the remote device 110 to create the first authentication code. Subsequently, the electronic device 100 checks the reply signal for the data or password provided by the user. It will be understood that other types of authentication codes may be used.

The first authentication code may provide additional security against an unauthorized remote device masquerading as the authorized remote device 110 to gain access to the sensitive data. If the reply signal does not include the correct first authentication code, the display controller 210 will not enable the display 115. For example, if an unauthorized user attempts to enable the display by transmitting a false reply signal that includes an incorrect first authentication code, the display controller will not enable the display 115.

Figure 3:
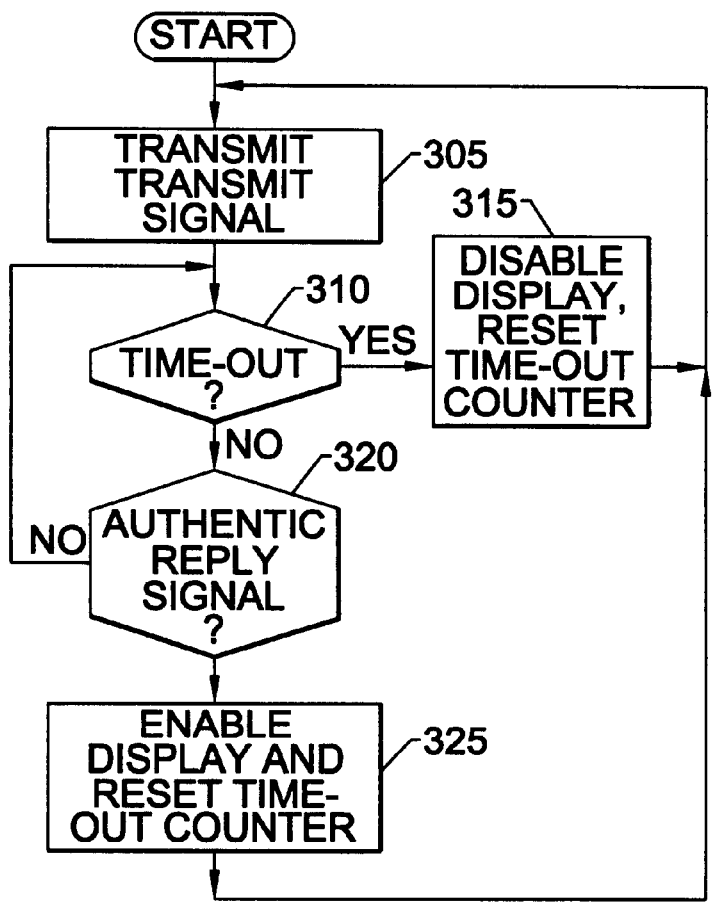
FIG. 3 is a flowchart that illustrates operations of an electronic device according to the present invention.

FIG. 3 is a flowchart that illustrates operations of an electronic device 100 according to the present invention. According to FIG. 3, the electronic device 100 transmits the transmit signal to the remote device 110 (block 305) and waits for a reply from the remote device 100. If a time-out occurs while waiting for the reply signal to be received (block 310), the display 115 is disabled, the time-out counter 225 is reset (block 315) and the transmit signal is re-transmitted (block 305).

If an authentic reply signal is received before a time-out occurs (block 320), the display controller 210 enables the display 115, resets the time-out counter (block 325), and transmits another transmit signal (block 305). If a non-authentic reply signal is received before a time-out occurs (block 320), the electronic device 100 continues to wait for the authentic reply signal (block 310) while the time-out interval continues to elapse.

Figure 4:
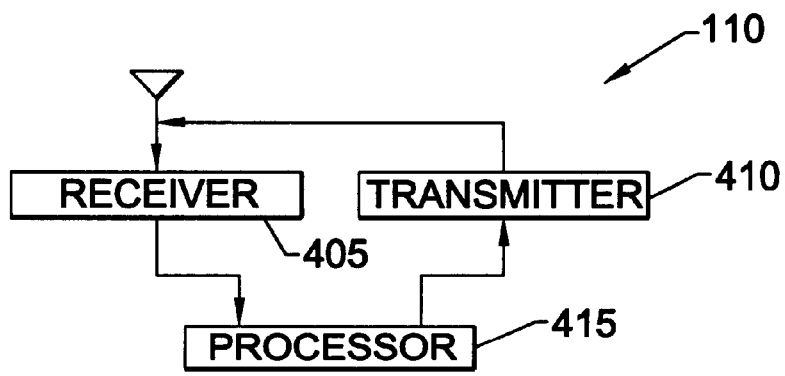
FIG. 4 is a block diagram of an embodiment of a remote device of FIG. 1.

FIG. 4 is a block diagram an embodiment of a remote device 110 of FIG. 1. According to FIG. 4, a receiver 405 receives the transmit signal from the electronic device 100. The received transmit signal is provided to a processor 415.

The processor 415 uses the transmit signal to determine if the distance between the electronic device 100 and the remote device exceeds the transmit range. If the distance does not exceed the transmit range, the remote device 110 transmits a reply signal to the electronic device 100 using a transmitter 410. If, however, the distance exceeds the transmit range, the remote device 110 does not transmit the reply signal to the electronic device 100.

In one embodiment of the present invention, the electronic device 100 and the remote device 110 are determined to be located within or beyond the transmit range using a signal threshold level. The signal threshold level corresponds to an expected signal strength of the transmit signal for the transmit range. The strength of the transmit signal received at the remote device 110 is compared to the signal threshold level. If the strength of the transmit signal at the remote device is about equal to or more than the signal threshold level, the electronic device 100 and the remote device 110 are assumed to be located within the transmit range of each other and the remote device 110 transmits the reply signal. If, however, the strength of the transmit signal at the remote device is less than the signal threshold level, the electronic device 100 and the remote device 110 are assumed to be located beyond the transmit range of each other and the remote device 110 does not transmit the reply signal.

In general, the strength of the transmit signal received at the remote device decreases as the distance traveled by the transmit signal increases. For example, a first signal strength may be observed at the remote device 110 for a transmit signal that travels 1 meter while a second signal strength, lower than the first signal strength, may be observed for a transmit signal which travels 4 meters. Accordingly, the signal threshold level can be adjusted to select a desired transmit range which is appropriate for the situation. For example, if the authorized user is traveling and desires relatively high security, the signal strength can be set high which corresponds to a relatively short transmit range such as 0.5 to 1 meter. A relatively short transmit range results in the display 115 being disabled when the remote device 110 is moved outside the relatively short transmit range. Alternately, if the authorized user is in his or her office and desires relatively low security, the signal strength can be set low for a relatively long transmit range.

In another embodiment of the present invention, the signal strength of the reply signal provided to the remote device 110 may be used to determine if the electronic device 100 and the remote device 110 are located within the transmit of each other. For example, the electronic device 100 may compare the signal strength of the reply signal to a signal threshold level and enable or disable the display based on that determination. It will be understood that other measures of signals may be used to determine the location of the electronic device 100 and the remote device 110 with respect to each other.

In a further embodiment of the present invention, the transmit signal includes a second authentication code, such as a pseudo-random code. The second authentication code identifies the electronic device 100 with which the remote device 110 cooperates to control the display 115. The remote device 110 uses the second authentication code to verify that the transmit signal received originated with the correct electronic device 100. For example, if multiple systems according to the present invention are being used in proximity to one another, the second authentication code can be used to identify the correct transmit signal from a number of transmit signals transmitted by the other electronic devices 100. For example, if a palm-top computer utilizing the present invention is located adjacent to the electronic device 100, the palm-top computer and the electronic device will both transmit respective transmit signals to their respective remote devices 110. If the authorized user of the palm-top computer moves beyond the respective transmit range associated with the palm-top computer, the second authentication code included in the transmit signal associated with the palm-top computer will not be verified by the remote device 110 for the electronic device 100. Accordingly, the remote device 110 will not transmit a reply signal to the palm-top, thereby disabling the display of the palm-top.

Figure 5:
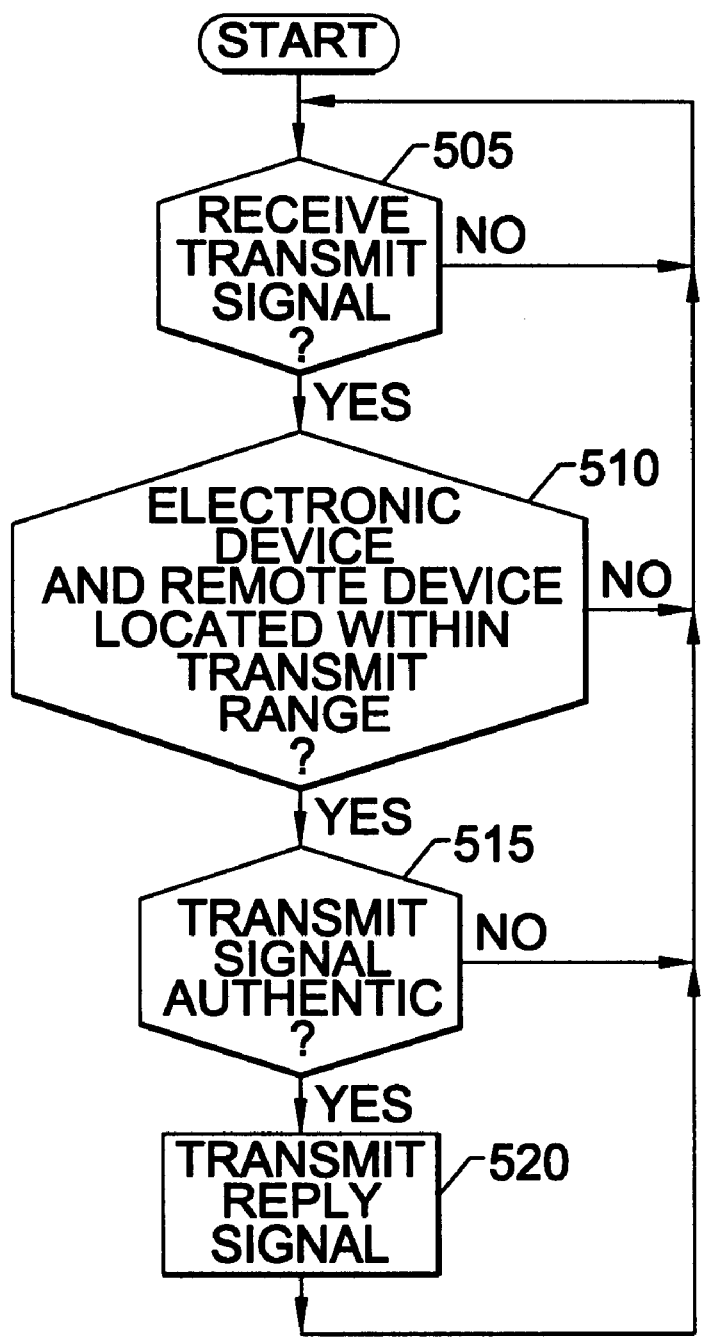
FIG. 5 is a flowchart that illustrates operations of a remote device according to the present invention.

FIG. 5 is a flowchart that illustrates operations of a remote device 110 according to the present invention. According to FIG. 5, the remote device 110 waits to receive the transmit signal from the electronic device 100 (block 505). When the transmit signal is received, the processor 415 determines if the electronic device 100 and the remote device 110 are located with the transmit range of each other (block 510).

If the processor 415 determines that the electronic device 100 and the remote device 110 are located within the transmit range of each other, the processor verifies that the transmit signal includes the correct authentication code (block 515). If the transmit signal indicates that the electronic device 100 and the remote device 110 are not located within the transmit range of each other (block 510), the remote device 110 does not transmit the reply signal and waits for another transmit signal to be received from the electronic device 100 (block 505). If the transmit signal includes the correct authentication code (block 515), the processor 415 generates the reply signal and transmits it to the electronic device 100 (block 520) and begins waiting for another transmit signal from the electronic device 100 (block 505).

The present invention is described above using flow chart illustrations. It will be understood that each block of the flowchart illustrations, and combinations of blocks in the flowchart illustrations, can be implemented by computer program instructions. These program instructions may be provided to a processor(s) within the electronic device 100 and remote device 110, such that the instructions which execute on the processor(s) create means for implementing the functions specified in the flowchart block or blocks. The computer program instructions may be executed by the processor(s) to cause a series of operational steps to be performed by the processor(s) to produce a computer implemented process such that the instructions which execute on the processor(s) provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of controlling a display of an electronic device that cooperates with a remote device, the method comprising the steps of:
   receiving at the remote device a first signal transmitted from the electronic device, wherein the step of receiving at the remote device comprises the step of receiving a receive authentication code, wherein the receive authentication code identifies the electronic device which cooperates with the remote device;
   transmitting a second signal from the remote device responsive to receiving the first signal to enable the display of the electronic device when the remote device and the electronic device are located within a transmit range of each other; and
   not transmitting the second signal from the remote device responsive to receiving the first signal to disable the display of the electronic device when the remote device and the electronic device are not located within the transmit range of each other.

2. The method of claim 1, wherein the step of transmitting comprises the step of transmitting a transmit authentication code to the electronic device, wherein the transmit authentication code identifies the remote device which cooperates with the electronic device.

3. The method of claim 2, wherein the transmit authentication code comprises a pseudo-random code.

4. The method of claim 1, wherein the step of receiving further comprises the step of determining whether the electronic device and the remote device are located within the transmit range of each other, wherein the transmit range is set using a signal threshold level for the first signal transmitted from the electronic device.

5. The method of claim 4, wherein the step of determining comprises the step of determining whether the electronic device and the remote device are located within the transmit range of each other, wherein the transmit range is adjustable.

6. A remote device that cooperates with an electronic device, the remote device comprising:
   a receiver that receives signals from the electronic device;
   a processor, coupled to the receiver, wherein the processor processes a first signal received from the electronic device through the receiver and generates a second signal, responsive to the first signal, when the electronic device and the remote device are located within a transmit range of each other, and wherein the processor does not generate the second signal when the electronic device and the remote device are not located within the transmit range of each other, wherein the first signal includes a receive authentication code, wherein the receive authentication code identifies the electronic device which cooperates with the remote device; and
   a transmitter, coupled to the processor, wherein the transmitter transmits the second signal from the remote device so that the display of the electronic device is enabled when the remote device and the electronic device are located within the transmit range of each other.

7. The remote device of claim 6, wherein the second signal includes a transmit authentication code, wherein the transmit authentication code identifies the remote device which cooperates with the electronic device.

8. The remote device of claim 7, wherein the transmit authentication code comprises a pseudo-random code.

9. The remote device of claim 6, wherein the transmit range is controlled using a signal threshold level for the first signal received from the electronic device.

10. The remote device of claim 6, wherein the transmit range is adjustable.

11. A method of controlling a display of an electronic device that cooperates with a remote device, the method comprising the steps of:
    receiving at the remote device a first signal transmitted from the electronic device;
    transmitting a second signal from the remote device responsive to receiving the first signal to enable the display of the electronic device when the remote device and the electronic device are located within a transmit range of each other; and
    ceasing transmission of the second signal from the remote device responsive to receiving the first signal to disable the display of the electronic device when the remote device and the electronic device are not located within the transmit range of each other.

12. The method of claim 11, wherein the step of receiving at the remote device comprises the step of receiving a receive authentication code, wherein the receive authentication code identifies the electronic device which cooperates with the remote device.

13. The method of claim 11, wherein the step of transmitting comprises the step of transmitting a transmit authentication code to the electronic device, wherein the transmit authentication code identifies the remote device which cooperates with the electronic device.

14. The method of claim 13, wherein the transmit authentication code comprises a pseudo-random code.

15. The method of claim 11, wherein the step of receiving further comprises the step of determining whether the electronic device and the remote device are located within the transmit range of each other at the remote device, wherein the transmit range is set using a signal threshold level for the first signal transmitted from the electronic device.

16. The method of claim 15, wherein the step of determining comprises the step of determining whether the electronic device and the remote device are located within the transmit range of each other, wherein the transmit range is adjustable.

17. A emote device that cooperates with an electronic device comprising:
    a receiver that transmits and receives signals to and from the electronic device;
    processor, coupled to the receiver, wherein the processor processes a first signal received from the electronic device through the receiver and generates a second signal, responsive to the first signal, when the electronic device and the remote device are located within a transmit range of each other, and wherein the processor ceases generating the second signal when the electronic device and the remote device are not located within the transmit range of each other; and
    a transmitter, coupled to the processor, wherein the transmitter transmits the second signal from the remote device so that the display of the electronic device is enabled when the remote device and the electronic device are located within the transmit range of each other.

18. The remote device of claim 17, wherein the first signal includes a receive authentication code, wherein the receive authentication code identifies the electronic device which cooperates with the remote device.

19. The remote device of claim 17, wherein the second signal includes a transmit authentication code, wherein the transmit authentication code identifies the remote device which cooperates with the electronic device.

20. The remote device of claim 19, wherein the transmit authentication code comprises a pseudo-random code.

21. The remote device of claim 17, wherein the transmit range is controlled using a signal threshold level for the first signal received from the electronic device.

22. The remote device of claim 17, wherein the transmit range is adjustable.

23. A system for controlling a display of an electronic device that cooperates with a remote device comprising:

means for receiving at the remote device a first signal transmitted from the electronic device;

means for transmitting a second signal from the remote device responsive to receiving the first signal to enable the display of the electronic device when the remote device and the electronic device are located within a transmit range of each other; and means for ceasing transmission of the second signal from the remote device responsive to receiving the first signal to disable the display of the electronic device when the remote device and the electronic device are not located within the transmit range of each other.

24. The system of claim 23, wherein the means for receiving at the remote device comprises means for receiving a receive authentication code, wherein the receive authentication code identifies the electronic device which cooperates with the remote device.

25. The system of claim 23, wherein the means for transmitting comprises means for transmitting a transmit authentication code to the electronic device, wherein the transmit authentication code identifies the remote device which cooperates with the electronic device.

26. The system of claim 25, wherein the transmit authentication code comprises a pseudo-random code.

27. The system of claim 23, wherein means for receiving further comprises means for determining whether the electronic device and the remote device are located within the transmit range of each other at the remote device, wherein the transmit range is set using a signal threshold level for the first signal transmitted from the electronic device.

28. The system of claim 27, wherein the means for determining comprises means for determining whether the electronic device and the remote device are located within the transmit range of each other, wherein the transmit range is adjustable.

* * * * *